(12) United States Patent
Yamazaki

(10) Patent No.: US 10,177,581 B2
(45) Date of Patent: Jan. 8, 2019

(54) SEMICONDUCTOR DEVICE AND CELL VOLTAGE EQUALIZATION METHOD FOR BATTERY CELL

(71) Applicant: LAPIS SEMICONDUCTOR CO., LTD., Kanagawa (JP)

(72) Inventor: Masato Yamazaki, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 158 days.

(21) Appl. No.: 15/220,421

(22) Filed: Jul. 27, 2016

(65) Prior Publication Data

US 2017/0033570 A1 Feb. 2, 2017

(30) Foreign Application Priority Data

Jul. 30, 2015 (JP) .................................. 2015-150951

(51) Int. Cl.
*H02J 7/00* (2006.01)
(52) U.S. Cl.
CPC .......... *H02J 7/0016* (2013.01); *H02J 7/0021* (2013.01)
(58) Field of Classification Search
CPC ...... H02J 7/0014; H02J 7/0016; H02J 7/0018; H02J 7/0019; H02J 7/0021; H02J 2007/0037; H02J 7/0022; H02J 7/0026; H02J 7/0052; H02J 7/0072; H02J 7/04; H02J 7/14; H02J 2007/005
USPC ................................................ 320/116, 118
See application file for complete search history.

(56) References Cited

U.S. PATENT DOCUMENTS

| | | | | | |
|---|---|---|---|---|---|
| 2004/0251934 | A1* | 12/2004 | Yano | ...................... | H02J 7/0016 327/91 |
| 2006/0082343 | A1* | 4/2006 | Sobue | .................... | H02J 7/0016 320/119 |
| 2006/0103349 | A1* | 5/2006 | Yamamoto | .......... | H01M 2/1022 320/116 |
| 2011/0109269 | A1* | 5/2011 | Li | ......................... | H02J 7/0016 320/116 |
| 2012/0187908 | A1* | 7/2012 | Tanigawa | ............ | B60L 11/1851 320/116 |
| 2012/0306451 | A1* | 12/2012 | Arai | ..................... | H01M 10/425 320/134 |
| 2013/0207610 | A1* | 8/2013 | Hull | ...................... | H02J 7/0016 320/118 |
| 2013/0242446 | A1* | 9/2013 | Oshima | .................. | H02H 3/207 361/86 |

FOREIGN PATENT DOCUMENTS

| | | | | |
|---|---|---|---|---|
| EP | 2700965 A2 * | 2/2014 | ............... | H02H 7/18 |
| JP | 2002-325370 A | 11/2002 | | |

* cited by examiner

*Primary Examiner* — Richard Isla
*Assistant Examiner* — Michael Dibenedetto
(74) *Attorney, Agent, or Firm* — Volentine, Whitt & Francos, PLLC

(57) ABSTRACT

A semiconductor device includes a serial resistance element section including plural resistance elements connected in series, each resistance element provided so as to correspond to one of a plural battery cells connected in series; a comparison section that compares a voltage of a connection point of the plural battery cells connected in series to a voltage of a connection point between the resistance elements that correspond to the battery cells; and a measurement section that measures a voltage of one of the plural battery cells.

7 Claims, 7 Drawing Sheets

FIG.3

```
...
if(cmp0==1) gc0=1;else gc0=0;
if(cmp0==0&&cmp1==1) gc1=1;else gc1=0;
...
if(cmp(n-2)==0&&cmp(n-1)==1) gc(n-1)=1;else gc(n-1)=0;
if(cmp(n-1)==0) gc(n)=1;else gc(n)=0;
...
```

FIG.7

```
...
if(cmph0==1) gc0=1;else gc0=0;
if(cmpl0==0&&cmph1==1) gc1=1;else gc1=0;
...
if(cmpl(n-2)==0&&cmph(n-1)==1) gc(n-1)=1;else gc(n-1)=0;
if(cmpl(n-1)==0) gc(n)=1;else gc(n)=0;
...
```

SEMICONDUCTOR DEVICE AND CELL VOLTAGE EQUALIZATION METHOD FOR BATTERY CELL

CROSS-REFERENCE TO RELATED APPLICATION

This application claims priority under 35 USC 119 from Japanese Patent Application No. 2015-150951, filed on Jul. 30, 2015, the disclosure of which is incorporated by reference herein.

BACKGROUND

Technical Field

The present disclosure relates to a semiconductor device and a cell voltage equalization method for battery cells.

Related Art

Japanese Patent Application Laid-Open (JP-A) No. JP 2002-325370 discloses a charge state control section including plural battery cells connected in series and plural resistance elements connected in series. The charge state control section compares a voltage of each battery cell with a voltage divided by the resistance elements. Further, based on the result of the comparison, the charge state control section discharges a battery cell that has a voltage exceeding an allowable range of ideal voltage values, and equalizes the cell voltage of each of the battery cells.

In the technique that uses plural battery cells described above, the cell voltage of the battery cells are measured so as to prevent over-discharge or over-charge of the battery cells. Meanwhile, recently, miniaturization in semiconductor devices are advancing, and micronization in integrated circuit (IC) chip for use in the semiconductor devices are required.

However, in the technique described in JP-A 2002-325370, since a group voltage detection circuit measures a total voltage of the battery cells connected in series, high voltage resistant elements are used in the semiconductor element that configure the group voltage detection circuit. As a result, the size of the IC chip increases and cost of the IC chip increases.

SUMMARY

The present disclosure provides a semiconductor device and a cell voltage equalization method for cell batteries that may prevent increase in size and increase in cost of the IC chip.

A first aspect according to the present disclosure is a semiconductor device, including: a serial resistance element section including plural resistance elements connected in series, each resistance element provided so as to correspond to one of a plural battery cells connected in series; a comparison section that compares a voltage of a connection point of the plural battery cells connected in series to a voltage of a connection point between the resistance elements that correspond to the battery cells; and a measurement section that measures a voltage of one of the plural battery cells.

A second aspect according to the present disclosure is a cell voltage equalization method for a battery cell, including: comparing a voltage of a connection point of a plural battery cells connected in series to a voltage of a connection point of a plural resistance elements connected in series, the plural resistance elements each being provided so as to correspond to one of plural battery cells connected in series, and being included in a serial resistance element section; and discharging, based on a result of comparing, a battery cell that satisfies a condition in which a voltage of a lower potential side of the connection point of the battery cell is lower than a voltage of a lower potential side of the connection point of the corresponding resistance element, and a condition in which a voltage of a higher potential side of the connection point of the battery cell is higher than a voltage of a higher potential side of the connection point of the corresponding resistance element.

A third aspect according to the present disclosure is a cell voltage equalization method for a battery cell, including: comparing a voltage of a connection point of plural battery cells connected in series to a voltage of a lower potential side with respect to a central potential of a resistance element disposed at a higher potential side of a connection point of a corresponding resistance element, and to a voltage of a higher potential side with respect to the central potential of the resistance element disposed at the lower potential side of a connection point of the corresponding resistance element, the plural resistance elements each being provided so as to correspond to one of plural battery cells connected in series, and being included in a serial resistance element section; and discharging, based on a result of comparison, a battery cell that satisfies a condition in which the voltage of the lower potential side of the connection point of the battery cell is lower than the voltage of the higher potential side with respect to the central potential of the resistance element disposed at the lower potential side of the connection point of the corresponding resistance element, and a condition in which the voltage of the higher potential side of the connection point of the battery cell is higher than the voltage of the lower potential side with respect to the central potential of the resistance element disposed at the higher potential side of the connection point of the corresponding resistance element.

According to the above aspects, the semiconductor device and the cell voltage equalization method for cell batteries may prevent increase in size and increase in cost of IC chip.

BRIEF DESCRIPTION OF THE DRAWINGS

Exemplary embodiments will be described in detail based on the following figures, wherein:

FIG. 3 illustrates an example of a source program that implements a cell voltage equalization algorithm according to the first exemplary embodiment;

FIG. 7 illustrates an example of a source program that implements a cell voltage equalization algorithm according to the second exemplary embodiment.

DETAILED DESCRIPTION

Exemplary embodiments of the present disclosure will be described below with reference to the drawings.

First Exemplary Embodiment

Hereinafter, a semiconductor device 10A according to the present exemplary embodiment will be described with reference to FIG. 1. In the description hereinafter, components configuring the semiconductor device 10A having the same structure, or signals or the like used in the semiconductor device 10A having the same purpose are indicated with the same references signs. On the other hand, in the description hereinafter, auxiliary characters will be added to reference signs in cases where it is necessary to distinguish between those components, signals, or the like. Further, in the description hereinafter, auxiliary characters will be omitted in cases where it is not necessary to distinguish between components having the same structure or signals or the like having the same purpose. Furthermore, hereinafter, N-channel-type metal-oxide semiconductor field effect transistor will be referred to as "NMOS transistor".

Figure 1:
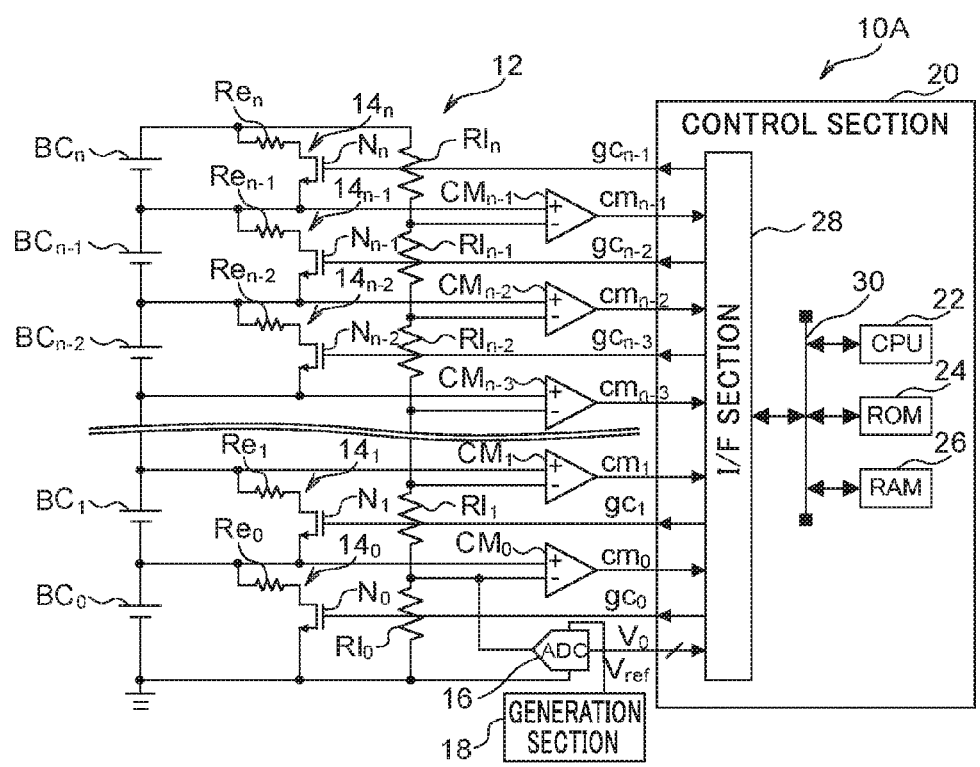
FIG. 1 is a circuit diagram (and partly, a block diagram) illustrating a configuration of a semiconductor device according to a first exemplary embodiment.

As illustrated in FIG. 1, a semiconductor device 10A of the present exemplary embodiment includes n+1 (n is a natural number) battery cells $BC_0$ to $BC_n$, a serial resistance element section 12, n comparators $CM_0$ to $CM_{n-1}$, and n+1 discharge sections $14_0$ to $14_n$. The semiconductor device 10A also includes an analog-to-digital converter (ADC) 16, a generation section 18, and a control section 20.

The n+1 battery cells BC of the present exemplary embodiment are connected in series. Negative electrode of a battery cell $BC_0$ is grounded. Note that, in the present exemplary embodiment, as an example, voltages of the battery cells BC at a full-charged state according to design specifications are configured to be the same.

Further, the serial resistance element section 12 of the present exemplary embodiment includes n+1 resistance elements $R1_0$ to $R1_n$ that are provided so as to respectively correspond, in one-to-one relation, to the n+1 battery cells BC. Further, the n+1 resistance elements R1 are connected in series. A resistance value of each of the resistance elements R1 are set based on the ratio of a voltage of the corresponding battery cell BC in the above full-charged state (which are set to be the same in the present exemplary embodiment). Furthermore, both ends of the battery cells BC connected in series are connected to both ends of the serial resistance element section 12.

Each of the comparators CM of the present exemplary embodiment are provided so as to respectively correspond to connection points of the battery cells BC (i.e., each corresponding connection point between the resistance elements R1). A non-inverted input terminal of each comparator CM is connected to the corresponding connection point between battery cells BC, and an inverted input terminal of the comparator CM is connected to the corresponding connection point between resistance elements R1. Further, an output terminal of the comparator CM is connected to the control section 20. Accordingly, the comparator CM compares the voltage of the corresponding connection point between the battery cells BC and the voltage of the corresponding connection point between the resistance elements R1, and as a result of the comparison, outputs an output signal cm to the control section 20.

Specifically, as an example, the comparator CM outputs a high (High) level signal as an output signal cm from the output terminal to the control section 20, in a case in which the voltage input to the non-inverted input terminal is higher than the voltage input to the inverted input terminal. Further, as an example, the comparator CM outputs a low (Low) level signal as an output signal cm from the output terminal to the control section 20, in a case in which the voltage input to the non-inverted terminal of the comparator CM is lower than the voltage input to the inverted input terminal. Note that, the comparator CM is an example of the comparison section of the present disclosure.

Each of The discharge sections 14 of the present exemplary embodiment are provided so as to respectively correspond to each of the battery cells BC. Each discharge section 14 includes a resistance element Re and an NMOS transistor N. One end of the resistance element Re is connected to the positive electrode of the battery cell BC, and the other end of the resistance element Re is connected to the drain electrode of the NMOS transistor N.

Source electrode of the NMOS transistor N is connected to the negative electrode of the corresponding battery cell BC. Gate electrode of The NMOS transistor N is connected to the control section 20. Accordingly, each the NMOS transistor N switches between ON and OFF in accordance with an input signal gc input from the control section 20 to the gate electrode of the NMOS transistor N.

Specifically, as an example, the NMOS transistor N turns ON in a case in which a high level signal is input to gate as the input signal gc, and turns OFF in a case in which a low level signal is input to gate as the input signal gc. Accordingly, the discharge section 14 of the present exemplary embodiment discharges the corresponding battery cell BC in a state in which the NMOS transistor N is turned ON due to control by the control section 20.

Two input terminals of the ADC 16 of the present exemplary embodiment are respectively connected to the two ends of the resistance element $R1_0$, and further, an input terminal is connected to the generation section 18. Further, an output terminal of the ADC 16 of the present exemplary embodiment is connected to the control section 20. The generation section 18 of the present exemplary embodiment generates a reference voltage $V_{ref}$, which is a reference voltage for a digital signal output from the ADC 16, and applies the reference voltage $V_{ref}$ to the ADC 16.

Based on the above configuration, the ADC 16 measures a voltage $V_0$ of the battery cell $BC_0$ by measuring a voltage of the connection point between the resistance elements $R1_0$ and $R1_1$ coverts the measured voltage $V_0$ to the digital signal, and outputs to the control section 20. Note that the ADC 16 is an example of the measurement section in the present disclosure.

Thus, in the semiconductor device 10A of the present exemplary embodiment, the ADC 16 measures the voltage between the resistance element R1 having the lowest voltage (namely, the voltage between the resistance elements $R1_0$ and $R1_1$). However, the present disclosure is not limited thereto. For example, the ADC 16 may measure voltage of any one connection point between adjacent resistance elements R1, other than the resistance elements $R1_0$ and $R1_1$.

In the semiconductor device 10A of the present exemplary embodiment, the ADC 16 measures the voltage of the corresponding battery cell BC by measuring the voltage between the resistance elements R1. However, the present disclosure is not limited thereto. For example, the ADC 16 may directly measure the voltage of the battery cell BC by connecting the each of two input terminals to the two ends of one of the battery cell BC.

The control section 20 of the present exemplary embodiment includes a central processing section (CPU) 22 that controls the entire operation of the semiconductor device 10A, and a read only memory (ROM) 24 that previously stores various types of programs, parameters, and the like. Further, the control section 20 includes a random access memory (RAM) 26, which is used as, for example, a work area for execution of the programs by the CPU 22, and an interface (I/F) section 28.

The I/F section 28 is connected to the gate terminals of the NMOS transistors N, the output terminals of the comparators CM, and the output terminal of the ADC 16. Further, the I/F section 28 includes an ADC and a digital-to-analog converter (DAC) (not illustrated in the drawings). Furthermore, the CPU 22, the ROM 24, the RAM 26, and the I/F section 28 are mutually connected with each other via a bus 30 such as an address bus, a data bus, or a control bus.

The control section 20 of the present exemplary embodiment accesses the ROM 24 and the RAM 26 by the CPU 22. The control section 20 outputs, by the CPU 22, the input signal gc, which has been converted into an analog signal by the DAC of the I/F section 28, to the gate electrodes of the NMOS transistors N via the I/F section 28. Further, the control section 20 acquires, by the CPU 22, the output signal cm, that has been converted into a digital signal by the ADC of the I/F section 28, from the comparators CM via the I/F section 28.

Figure 2:
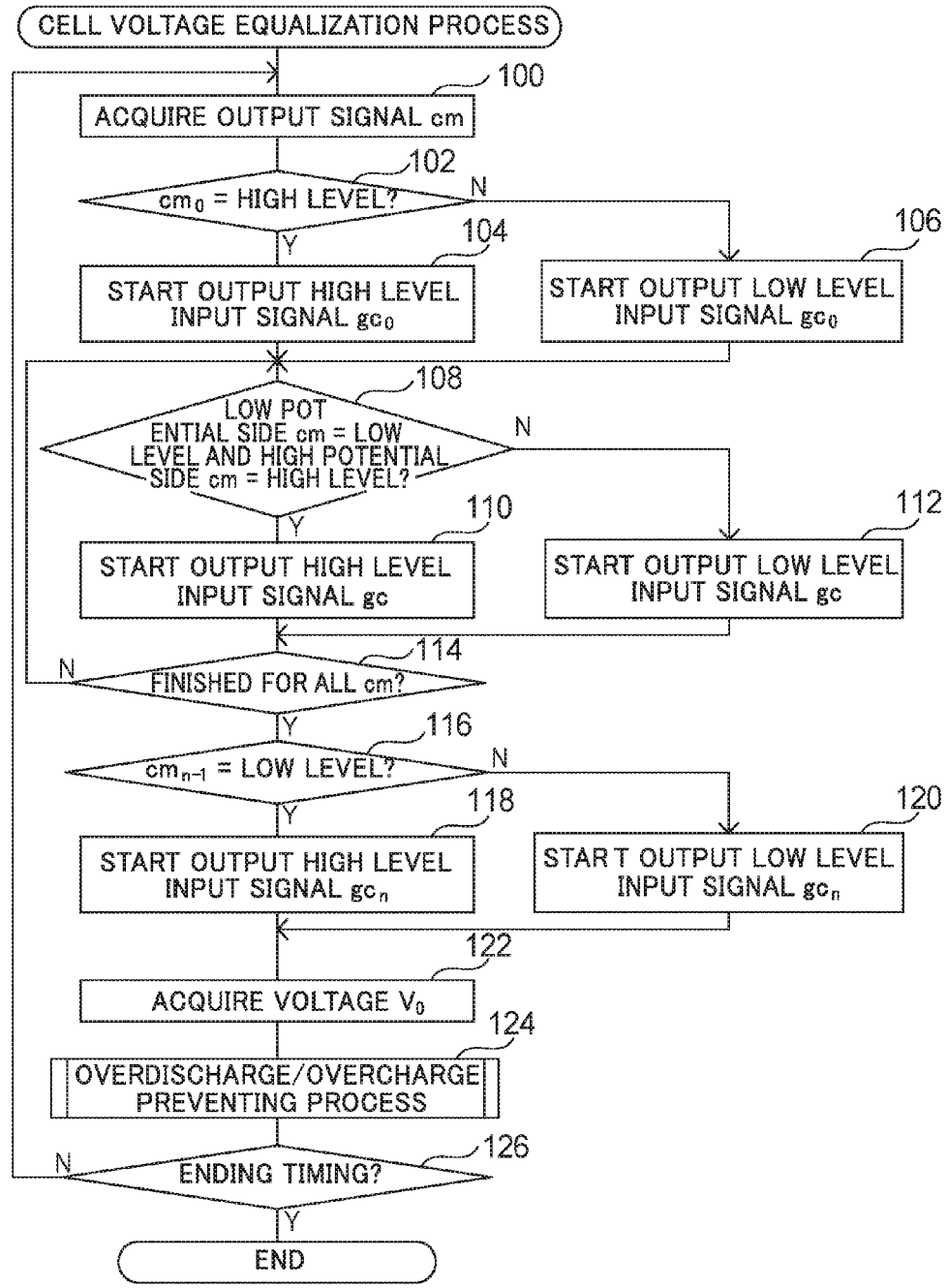
FIG. 2 is a flowchart illustrating a flow of a cell voltage equalization process program according to the first exemplary embodiment.

Hereinafter, operations of the semiconductor device 10A according to the present exemplary embodiment will be described by referring to FIG. 2. FIG. 2 is a flowchart illustrating a process flow of a cell voltage equalization process program executed by the CPU 22 in a case in which, for example, the semiconductor device 10A is in a power-on state. Note that the cell voltage equalization process program is previously installed in the ROM 24.

In step 100 of FIG. 2, the CPU22 acquires the output signals cm output from each of the comparators CM via the I/F section 28. Next, in step 102, the CPU 22 determines whether or not an output signal $cm_0$ among the output signals cm acquired in the above step 100 is high level signal. If the determination is affirmative, the CPU 22 proceeds to step 104. On the other hand, if the determination is negative, the CPU 22 proceeds to step 106.

In step 104, the CPU 22 starts to output the high level signal, as the input signal $gc_0$, to the gate of the NMOS transistor $N_0$ via the I/F section 28. On the other hand, in step 106, the CPU 22 starts to output the low level signal, as the input signal $gc_0$, to the gate electrode of the NMOS transistor $N_0$ via the I/F section 28.

In step 108, the CPU 22 makes a determination described below on a pair of output signals cm (hereinafter referred to as "process target signals") among the output signals cm acquired in step 100. The pair of output signals cm are the signals output from a pair of adjacent comparators CM. For the process target signals, the CPU 22 determines whether or not the output signal cm output from the low potential side comparator CM is low level signal, and the output signal cm output from the high potential side comparator CM is high level signal. In a case in which the determination is affirmative, the CPU 22 proceeds step 110. On the other hand, in a case in which the determination is negative, the CPU 22 proceeds to step 112.

In step 110, the CPU 22 starts to output, via the I/F section 28, high level signal, as the input signal gc, to the gate of an NMOS transistor N of the discharge section 14 that corresponds to a battery cell BC having both ends connected to the pair of comparators CM from which the above process target signals have been output. In step 112, the CPU 22 starts to output, via the I/F section 28, low level signal, as the input signal gc, to the gate of an NMOS transistor N in the discharge section 14 that corresponds to a battery cell BC having both ends connected to the pair of comparators CM from which the above process target signals have been output.

In step 114, the CPU 22 determines whether or not the process of step 108 and the process of either step 110 or step 112 are finished for all output signals cm. If the determination is negative, the CPU 22 returns to step 108. On the other hand, if the determination is affirmative, the CPU 22 proceeds to step 116. Note that, in the present exemplary embodiment, in a case in which the process of step 108 and the process of step 110 or step 112 are repeatedly executed, the CPU 22 uses the pair of output signals cm that have not been the process targets as the process target signals.

Here, specific examples of the process executed in the above steps 108 to 114 will be described below. For example, in a case in which the pair of output signals cm are the output signal $cm_0$ and the output signal $cm_1$, and in a case in which the output signal $cm_0$ is low level signal and the output signal $cm_1$ is high level signal, high level signal is input as the input signal $gc_1$ to the gate electrode of the NMOS transistor $N_1$. As a result, the NMOS transistor $N_1$ turns ON, and the battery cell $BC_1$ is discharged. On the other hand, in a case except a case in which the output signal $cm_0$ is low level signal and the output signal $cm_1$ is high level signal, low level signal is input as the input signal $gc_1$ to the gate of the NMOS transistor $N_1$. As a result, the NMOS transistor $N_1$ turns OFF, and the battery cell $BC_1$ is not discharged. Namely, the battery cell $BC_1$ that has started discharging in a case in which the output signal $cm_0$ is low level signal and the output signal $cm_1$ is the high level signal, stops discharging in a case in which, for example, the output signal $cm_1$ becomes low level signal. The above process are sequentially executed for combinations of the output signals from the output signals $cm_0$ and $cm_1$, $cm_1$ and $cm_2$, to the output signals $cm_{n-3}$ and $_{n-2}$, $cm_{n-2}$ and $cm_{n-1}$.

In step 116, the CPU 22 determines, among the output signals cm acquired in the process of the above step 100, whether or not the output signal $cm_{n-1}$ is low level signal. If the determination is affirmative, the CPU 22 proceeds to step 118. On the other hand. If the determination is negative, the CPU 22 proceeds to the processing of step 120.

In step 118, the CPU 22 starts to output the high level signal as the input signal $gc_n$ to the gate of the NMOS transistor $N_n$ via the I/F section 28. In step 120, the CPU 22 starts to output the low level signal as the input signal $gc_n$ to the gate of the NMOS transistor $N_n$ via the I/F section 28.

In step 122, the CPU 22 acquires a voltage $V_0$ output from the ADC 16 via the I/F section 28. In step 124, the CPU 22 executes over-discharge/over-charge preventing process. In the over-discharge/over-charge preventing process, the CPU 22, for example, forcibly terminates the cell voltage equalization process program and notifies, in a case in which, for example, the voltage $V_0$ acquired from in step 122 is out of an allowable voltage range.

Next, in step 126, the CPU 22 determines whether or not predetermined ending timing has come. If the determination is negative, the CPU 22 returns to step 100. If the determination is affirmative, the CPU 22 ends the cell voltage equalization process program. Note that, in the present exemplary embodiment, as the above predetermined timing, timing when the power for semiconductor device 10A is tuned to power-OFF state, is applied.

FIG. 3 illustrates an example of a source program that implements a cell voltage equalization algorithm executed by the processes of steps 100 to 120 in the cell voltage equalization process program described above. Note that each of the variables cmp0 to cmp(n−1) in FIG. 3 respectively correspond, in one-to-one relation, to each of the output signals $cm_0$ to $cm_{n-1}$. Further, in the present exemplary embodiment, as an example, "1" is stored in the variables cmp0 to cmp(n−1) in a case in which corresponding output signal $cm_0$ to $cm_{n-1}$ is at a high level, and "0" is stored in a case in which corresponding output signal $cm_0$ to $cm_{n-1}$ is at a low level.

Further, each of variables gc0 to gc(n) in FIG. 3 respectively correspond, in one-to-one relation, to each of the input signals $gc_0$ to $gc_n$. Further, in the present exemplary embodiment, as an example, in a case in which "1" is stored in the variables gc0 to gc(n), the control section 20 starts to output a high level signal as the corresponding input signals $gc_0$ to $gc_n$. Furthermore, in the present exemplary embodiment, as an example, in a case in which "0" is stored in the variables gc0 to gc(n), the control section 20 starts to output a low level signal as the corresponding input signals $gc_0$ to $gc_n$.

Thus, as explained above, the present exemplary embodiment measures the voltage of one battery cell (which is the battery cell $BC_0$ in the present exemplary embodiment) out of the battery cells connected in series (which are the battery cells $BC_0$ to $BC_n$ in the present exemplary embodiment). Further, in the present exemplary embodiment, by the process steps 100 to 120 of the above cell-voltage-equalization processing program, the voltage equalization process of the battery cells $BC_0$ to $BC_n$ are executed. Due to the above, by measuring the voltage of the battery cell $BC_0$, voltages of the battery cells $BC_1$ to $BC_n$ may be estimated. Accordingly, the present exemplary embodiment may use low-voltage resistant elements in the measurement section (the ADC 16 in the present exemplary embodiment) that measures the voltage of the battery cells, compared to a case in which the entire voltage of the battery cells is measured. Thus, the present exemplary embodiment may prevent increase in size and cost of the IC chip.

Further, the present exemplary embodiment measures the voltage of a corresponding battery cell (the battery cell $BC_0$ in the present exemplary embodiment) by measuring the voltage of one connection point (the connection point between the resistance elements $R1_0$ and $R1_n$ in the present exemplary embodiment) among the resistance elements connected in series in the resistance element section (the serial resistance element section 12 in the present exemplary embodiment) in which plural resistance elements the resistance elements $R1_0$ and $R1n$ in the present exemplary embodiment) are connected in series. In measuring the voltage of the battery cell, a stable result may not be obtained due to discharging or charging processes executed in the battery cell. However, the present exemplary embodiment may achieve more stable measurement result, compared to a case in which the voltage of the battery cells are directly measured.

Further, the present exemplary embodiment measures the voltage of the battery cell having the lowest potential (the battery cell $BC_0$ in the present exemplary embodiment) among the battery cells. Accordingly, the present exemplary embodiment may use the low-voltage resistant element in the measurement section, and thus may prevent increase in size and cost of the IC chip, compared to a case in which the voltage of one of battery cells other than the battery cell having the lowest potential is measured.

Note that the circuit configuration of the semiconductor device 10A is not limited to the above-described circuit configuration. For example, the discharge section 14 may include a PMOS transistor instead of the NMOS transistor, or may include another switching elements.

Second Exemplary Embodiment

Here, a semiconductor device 10B according to a second exemplary embodiment will be described by referring to FIGS. 4 and 5. Note that FIGS. 4 and 5 include configuring components having the same functions as those in FIG. 1. Thus, such components are indicated by the same reference signs as in FIG. 1, and description thereof will be omitted. Note that FIG. 5 is an enlarged view of a broken line rectangular portion of FIG. 4.

Figure 4:
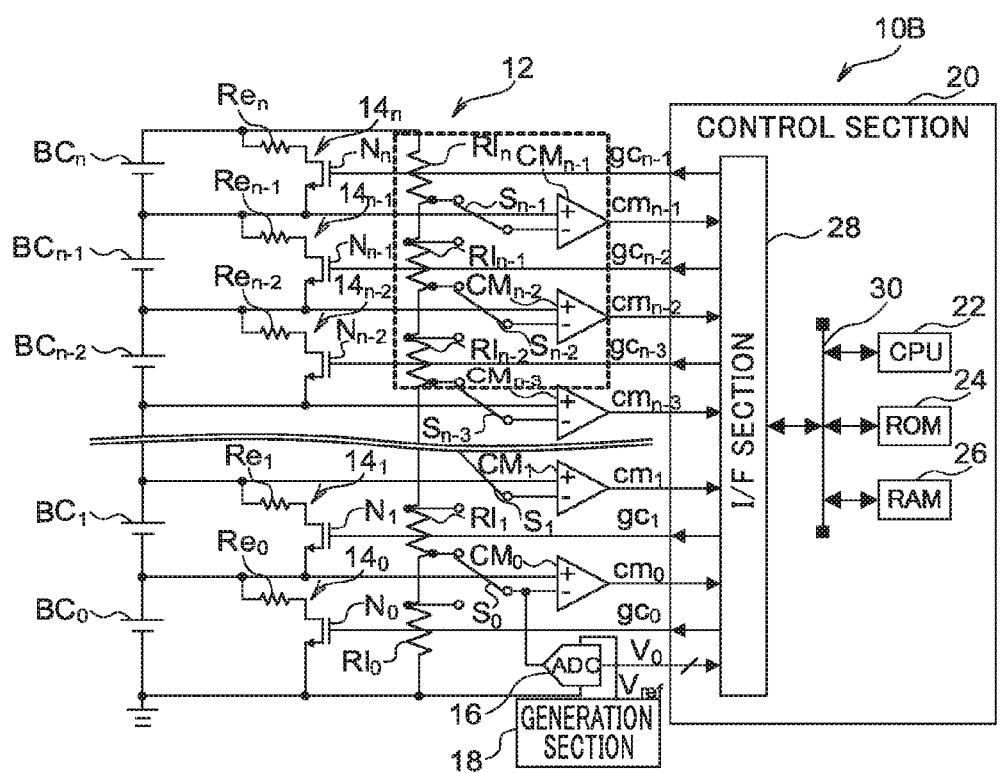
FIG. 4 is a circuit diagram (and partly, a block diagram) illustrating a configuration of a semiconductor device according to a second exemplary embodiment.
Figure 5:
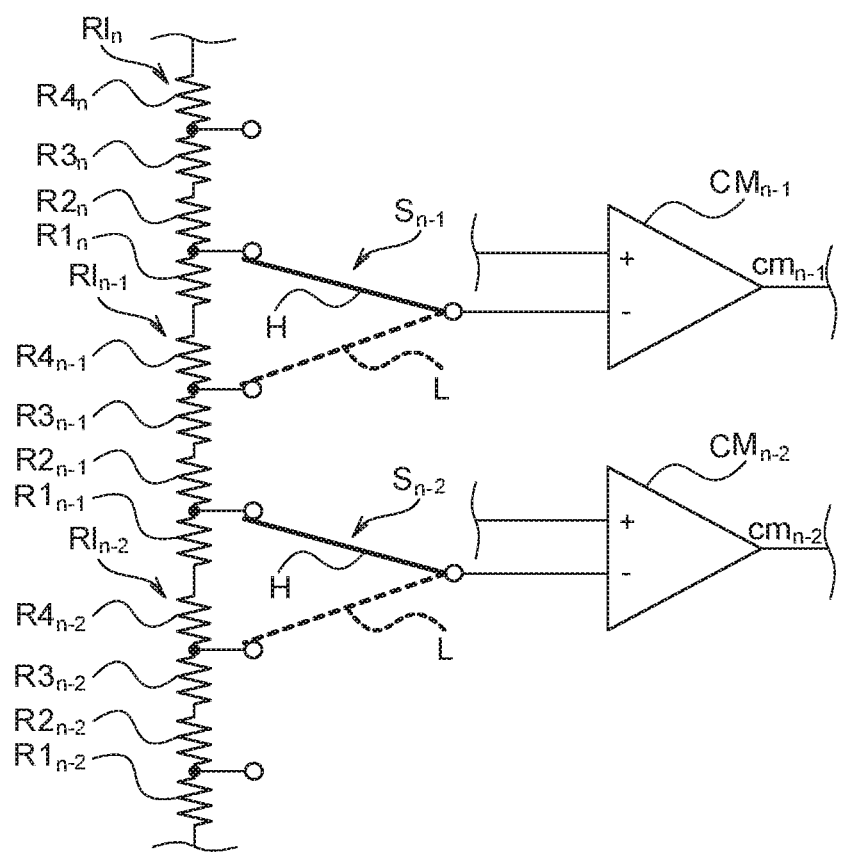
FIG. 5 is an enlarged view of a broken line rectangular portion of FIG. 4.

As illustrated in FIGS. 4 and 5, the semiconductor device 10B according to the present exemplary embodiment further includes switches $S_0$ to $S_{n-1}$ each respectively corresponds to connection points between the resistance elements $R1_0$ to $R1_n$.

The resistance element R1 of the present exemplary embodiment includes detection paths configured to detect voltages at the high potential side and the low potential side with respect to the center potential of the resistance element R1. Namely, as illustrated in FIG. 5, the resistance element R1 according to the present exemplary embodiment includes plural (four in the present exemplary embodiment) resistance elements R1 to R4 connected in series.

Further, one of the two ends of the switch S (ends at left side of switch S in FIG. 5) is connected to the lower potential side connection point between resistance elements within the resistance element R1 (between the resistance elements R1 and R2 in the present exemplary embodiment) disposed at the higher potential side among the corresponding connection point between the resistance elements R1. The other of the two ends of the switch S is connected to the higher potential side connection point within the resistance element R1 (between the resistance elements R3 and R4 in the present exemplary embodiment) disposed at the lower potential side among the corresponding connection point between the resistance elements R1.

Furthermore, the other end of the switch S (ends at right side of switch S in FIG. 5) is connected to an inverted input terminal of the corresponding comparator CM. Further, the switch S switches between two connection states, a state in which the switch S is connected to one of the above two connection points, or a state in which the switch S is connected to the other one of the above two connection points, by control from the control section 20. Note that, in the description hereinafter, "state H" refers to a state (indicated by a bold line in FIG. 5) in which the switch S is connected the lower potential side connection point between resistance elements within the resistance element R1 disposed at the higher potential side among the corresponding connection point between the resistance elements R1. Similarly, "state L" refers to a state (indicated by a broken line in FIG. 5) in which the switch S is connected the higher potential side connection point within the resistance element R1 disposed at the lower potential side among the corresponding connection point between the resistance elements R1.

Note that the number of the resistance elements R1 to R4 included in the resistance elements R1 and the connecting positions with the switch S in the resistance elements R1 are not limited to the above, unless the voltage of higher and lower potential sides with respect to the central potential of the resistance element R1 can be detected.

Figure 6:
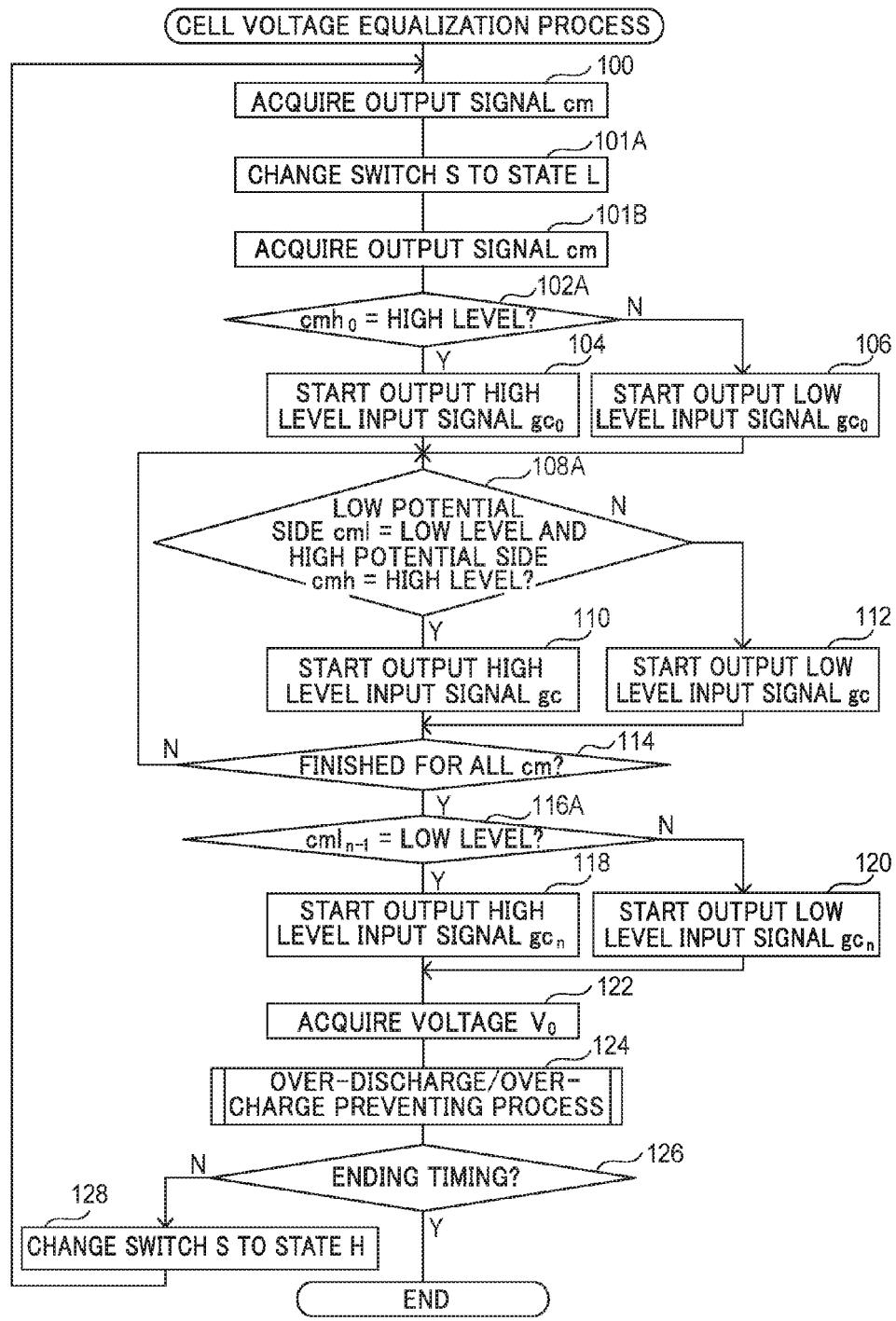
FIG. 6 is a flowchart illustrating a flow of a cell voltage equalization process program according to the second exemplary embodiment.

Next, operation of the semiconductor device 10B of the present exemplary embodiment will be described below with reference to FIG. 6. FIG. 6 is a flowchart illustrating a flow of a cell battery equalization process program executed by the CPU 22, in a case in which, for example, the semiconductor device 10B has tuned to the power-on state. Note that the cell voltage equalization process program is previously installed in the ROM 24. Note that process steps in FIG. 6 that are the same process as the process in FIG. 2 are denoted with same reference numbers as those in FIG. 2, and description thereof will be omitted. Here, in the following description, a case in which the switch S is in the state H as the initial connection state will be described.

In step 101A in FIG. 6, the CPU 22 changes the connection state of the switch S to the state L. Next, in the step 101B, the CPU 22 acquires each output signals cm from each of the comparators CM via the I/F section 28. Note that, in the description hereinafter, in order to clarify the description, the output signal cm acquired by the processing of step 100 is referred to as the "output signal cmh", and the output signal cm acquired by the processing of step 101B is referred to as the "output signal cml".

In next step 102A, the CPU 22 determines whether or not the output signal $cmh_0$, among the output signals cmh acquired in the step 100, is high level signal. If the determination is affirmative, the CPU 22 proceeds to step 104. If the determination is negative, the CPU 22 proceeds to step 106.

In step 108A, the CPU 22 makes a determination described below on a pair of output signals cmh, cml (hereinafter referred to as "process target signals") which are output from a pair of adjacent comparators CM, among the output signals cmh acquired from the processing of step 100 and the output signals cml acquired from the processing of step 101B. For the process target signals, the CPU 22 determines, among the process target signals, whether or not the output signal cml output from the comparator CM on the lower potential side is low level signal, and the output signal cmh output from the comparator CM on the higher potential side is high level signal. If the determination is affirmative, the CPU 22 proceeds to step 110. If the determination is negative, the CPU 22 proceeds of step 112.

In step 116A, the CPU 22 determines whether or not the output signal $cml_{n-1}$, which is among the output signals cml acquired in the processing of the above step 101B, is low level signal. If the determination is affirmative, the CPU 22 proceeds to step 118. If the determination is negative, the CPU 22 proceeds to step 120.

If the determination is negative in step 126, the CPU 22 proceeds to step 128. In step 128, the CPU 22 changes the connection state of the switch S to the state H, then returns to step 100. Namely, the present exemplary embodiment also allows the battery cell BC to start discharging by process steps 104, 110 or 118, and then allows the battery cell BC to stop discharging by corresponding process steps 106, 112, or 120.

FIG. 7 illustrates an example of a source program that implements a cell voltage equalization algorithm according to the present exemplary embodiment in contrast to FIG. 3 that illustrates the first exemplary embodiment. Note that, each of the variables cmph0 to cmph(n−1) in FIG. 7 respectively correspond, in one-to-one relation, to each of the output signals $cmh_0$ to $cmh_{n-1}$. Further, each of the variables cmpl0 to cmpl(n−1) in FIG. 7 respectively correspond, in one-to-one relation, to the output signals $cml_0$ to $cml_{n-1}$. Further, in the present exemplary embodiment, as an example, "1" is stored in the variables cmph0 to cmph(n−1) and cmpl0 to cmpl(n−1) in a case in which corresponding output signals $cmh_0$ to $cmh_{n-1}$ and $cml_0$ to $cml_{n-1}$ is high level, and store "0" is stored in a case in which output signals $cmh_0$ to $cmh_{n-1}$ and $cml_0$ to $cml_{n-1}$ is low level.

As described above, the second exemplary embodiment may achieve the same function as that of the first exemplary embodiment. Further, in the second exemplary embodiment, voltage rage of the comparators CM used for comparing the voltage of the connection points among battery cells BC may be wider than the first exemplary embodiment. Thus, when compared to the first exemplary embodiment, the second exemplary embodiment may reduce the frequency of switching of the NMOS transistors N between ON and OFF, repeating in a short cycle.

Although the exemplary embodiments have been described above, the technical range of the present disclosure is not limited to the range described in the above exemplary embodiments. Various modifications and improvements may be made to the above exemplary embodiments without departing from the range of the present disclosure. The technical range of the present disclosure also includes such various modifications and improvements of the exemplary embodiments.

The above exemplary embodiments do not limit the present disclosure. In addition, all combinations of the features described in the exemplary embodiments are not always necessary for achieving the function of the present disclosure. Thus, the exemplary embodiments encompass various stages of invention, and the invention can be extracted therefrom according to the combinations of the plural constituent components of the present disclosure. Further, invention can be extracted even when some of the constituent components are deleted from the entire constituent components described in the above exemplary embodiments, unless functions can be achieved therefrom.

For example, in the second exemplary embodiment, a case in which the voltage of two positions of the resistance elements R1 are detected, has been described. However, the present disclosure is not limited thereto. Voltage of three or more positions of the resistance elements R1 may be detected. In such case, for example, two positions at the higher potential side and two positions at the lower potential side with respect to the center of the resistance element R1 may be connected to the inverted input terminal of the individual comparator CM via the switch S. Further, in such case, for example, which one of the two positions at the higher potential side is connected to the switch S in the state L, and which one of the two positions at the lower potential side is connected to the switch S in the state H needs to be determined previously. In such case, the voltage input to the inverted terminal of the individual comparators CM may be more finely set, compared to the case of the second exemplary embodiment.

Further, in the exemplary embodiments, cases in which the cell-voltage-equalization process program is previously installed in the ROM 24, have been described. However, the present disclosure is not limited thereto. For example, the cell voltage equalization process program may be stored in the storage medium such as a compact disk read only memory (CD-ROM), or provided via network.

Note that, the configurations of the semiconductor devices described in the above exemplary embodiments (see FIGS. 1, 4, and 5) are examples, and it is obvious that deletion of unnecessary portions or addition of new portions within a range not departing from the contents of the present disclosure is possible.

Further, the cell voltage equalization process described in the exemplary embodiments (see FIGS. 2 and 6) are examples, and it is obvious that deletion of unnecessary steps, addition of new steps, or replacement of the process order within a range not departing from the contents of the present disclosure is possible.

What is claimed is:

1. A semiconductor device, comprising:
a serial resistance element section including a plurality of resistance elements connected in series, the resistance elements provided so as to correspond to respective ones of a plurality of battery cells connected in series;
a comparison section that compares voltages of connection points of the plurality of battery cells connected in series to a voltage respective voltages of connection points between the resistance elements that correspond to the battery cells; and
a measurement section that measures a voltage of one of the plurality of battery cells,
wherein each of the plurality of resistance elements includes a voltage detection path configured to detect, with respect to a central potential of a resistance element, a voltage of the higher potential side and a voltage of a lower potential side,
wherein the comparison section compares the voltages of each of the connection points of the battery cells to the voltage of the lower potential side with respect to the central potential of the resistance element disposed at the higher potential side of the connection point of the corresponding resistance element, and
wherein the comparison section compares the voltages of each of the connection points of the battery cells to the voltage of the higher potential side with respect to the central potential of the resistance element disposed at the lower potential side of the connection point of the corresponding resistance element.

2. The semiconductor device according to claim 1, wherein the measurement section measures a potential difference between one end and an other end of one of the resistance elements.

3. The semiconductor device according to claim 1, wherein the measurement section measures a voltage of a battery cell having a lowest potential among the plurality of battery cells.

4. The semiconductor device according to claim 1, further comprising:
a discharge section that selectively discharges at least one of the plurality of battery cells; and
a control section that, based on a result of comparison by the comparison section, controls the discharge section to discharge a battery cell that satisfies a condition in which the voltage of the lower potential side of the connection point of the battery cell is lower than the voltage of the higher potential side with respect to the central potential of the resistance element disposed at the lower potential side of the connection point of the corresponding resistance element, and a condition in which the voltage of the higher potential side of the connection point of the battery cell is higher than the voltage of the lower potential side with respect to the central potential of the resistance element disposed at the higher potential side of the connection point of the corresponding resistance element.

5. The semiconductor device according to claim 4, wherein the control section controls, based on the result of comparison by the comparison section, the discharge section to discharge,
a battery cell having a highest potential among the plurality of battery cells in a case in which the voltage of the lower potential side of the connection point of the battery cell having the highest potential is lower than the voltage of the higher potential side with respect to the central potential of the resistance element disposed at the lower potential side of the connection point of the corresponding resistance element, and
a battery cell having a lowest potential among the plurality of battery cells in a case in which the voltage of the higher potential side of the connection point of the battery cell having the lowest potential is higher than the voltage of the lower potential side with respect to the central potential of the resistance element disposed at the higher potential side of the connection point of the corresponding resistance element.

6. A cell voltage equalization method for a battery cell, comprising:
comparing voltages of connection points of a plurality of battery cells connected in series to a voltage of a lower potential side with respect to a central potential of a resistance element disposed at a higher potential side of a connection point of a corresponding resistance element, and to a voltage of a higher potential side with respect to the central potential of the resistance element disposed at the lower potential side of a connection point of the corresponding resistance element, the plurality of resistance elements being provided so as to correspond to respective ones of a plurality of battery cells connected in series, and being included in a serial resistance element section; and
discharging, based on a result of comparison, a battery cell that satisfies a condition in which the voltage of the lower potential side of the connection point of the battery cell is lower than the voltage of the higher potential side with respect to the central potential of the resistance element disposed at the lower potential side of the connection point of the corresponding resistance element, and a condition in which the voltage of the higher potential side of the connection point of the battery cell is higher than the voltage of the lower potential side with respect to the central potential of the resistance element disposed at the higher potential side of the connection point of the corresponding resistance element.

7. The cell voltage equalization method for a battery cell according to claim 6, further comprising, based on the result of comparison, discharging
a battery cell having a highest potential among the plurality of battery cells in a case in which the voltage of the lower potential side of the connection point of the battery cell having the highest potential is lower than the voltage of the higher potential side with respect to the central potential of the resistance element disposed at the lower potential side of the connection point of the corresponding resistance element, and
a battery cell having a lowest potential among the plurality of battery cells in a case in which the voltage of the higher potential side of the connection point of the battery cell having the lowest potential is higher than the voltage of the lower potential side with respect to the central potential of the resistance element disposed at the higher potential side of the connection point of the corresponding resistance element.

* * * * *